United States Patent
Mehmood et al.

(10) Patent No.: US 11,445,555 B2
(45) Date of Patent: Sep. 13, 2022

(54) CONSTRAINED OPTIMIZATION OF WIRELESS LINKS IN NETWORKS WITH COMPETING OBJECTIVES

(71) Applicant: ASSIA SPE, LLC, Wilmington, DE (US)

(72) Inventors: Haleema Mehmood, Menlo Park, CA (US); Sahand Golnarian, Redwood City, CA (US); Manikanden Balakrishnan, Foster City, CA (US); Mehdi Mohseni, San Francisco, CA (US)

(73) Assignee: DZS Inc., Plano, TX (US)

( * ) Notice: Subject to any disclaimer, the term of this patent is extended or adjusted under 35 U.S.C. 154(b) by 103 days.

(21) Appl. No.: 16/811,593

(22) Filed: Mar. 6, 2020

(65) Prior Publication Data

US 2020/0288510 A1    Sep. 10, 2020

Related U.S. Application Data

(60) Provisional application No. 62/816,774, filed on Mar. 11, 2019, provisional application No. 62/815,869, filed on Mar. 8, 2019.

(51) Int. Cl.
*H04W 76/10* (2018.01)
*H04B 17/318* (2015.01)
*H04W 24/02* (2009.01)
*H04W 24/08* (2009.01)

(52) U.S. Cl.
CPC .......... *H04W 76/10* (2018.02); *H04B 17/318* (2015.01); *H04W 24/02* (2013.01); *H04W 24/08* (2013.01)

(58) Field of Classification Search
CPC ..... H04W 76/10; H04W 24/02; H04W 24/08; H04B 17/318
See application file for complete search history.

(56) References Cited

U.S. PATENT DOCUMENTS

| | | | |
|---|---|---|---|
| 2013/0272285 A1 | 10/2013 | Goldsmith et al. | |
| 2014/0328257 A1* | 11/2014 | Kamlani | H04W 24/10 370/329 |
| 2015/0171953 A1 | 6/2015 | Djukic et al. | |
| 2015/0223114 A1 | 8/2015 | Tian et al. | |
| 2015/0223160 A1* | 8/2015 | Ho | H04W 48/20 370/338 |
| 2015/0312778 A1* | 10/2015 | Chandrasekhar | H04W 16/26 455/419 |

(Continued)

OTHER PUBLICATIONS

International Search Report and Written Opinion dated Jul. 1, 2020, in International Patent Application No. PCT/US2020/021515, filed Mar. 6, 2020, (12 pgs).

(Continued)

*Primary Examiner* — Walli Z Butt
*Assistant Examiner* — Ryan C Kavleski
(74) *Attorney, Agent, or Firm* — North Weber & Baugh LLP; Michael North

(57) ABSTRACT

Various embodiments of the invention describe systems, devices and methods used to improve network topology connectivity by implementing throughput analysis between an access point and a plurality of extenders. This throughput analysis may include measurements such as interference and load values.

22 Claims, 9 Drawing Sheets

(56) References Cited

U.S. PATENT DOCUMENTS

2016/0302096 A1* 10/2016 Chari .................... H04W 24/08
2017/0135018 A1    5/2017 Amini et al.
2017/0272194 A1    9/2017 Scahill et al.
2018/0213416 A1    7/2018 Tazzari et al.
2019/0373464 A1* 12/2019 Chari ...................... H04L 41/12
2020/0229193 A1*  7/2020 Abiri .................... H04W 24/08

OTHER PUBLICATIONS

International Preliminary Report on Patentability dated Aug. 25, 2021 in the PCT application No. PCT/US2020/021515, (8 pgs).
European response to communication 161 filed Apr. 22, 2022 in related European application No. 20770112.9, (2 pgs).

* cited by examiner

CONSTRAINED OPTIMIZATION OF WIRELESS LINKS IN NETWORKS WITH COMPETING OBJECTIVES

CROSS-REFERENCE TO RELATED APPLICATIONS

This patent application is related to and claims priority benefit under 35 USC § 119(e) to the following commonly-owned U.S. provisional patent applications: U.S. Pat. App. Ser. No. 62/815,869, filed on Mar. 8, 2019, entitled "Constrained Optimization of Wireless Links in Networks with Competing Objectives," and listing Haleema Mehmood, Sahand Golnarian, Manikanden Balakrishnan, and Mehdi Mohseni as inventors; commonly-owned U.S. Pat. App. Ser. No. 62/816,774, filed on Mar. 11, 2019, entitled "Constrained Optimization of Wireless Links in Networks with Competing Objectives," and listing Haleema Mehmood, Sahand Golnarian, Manikanden Balakrishnan, and Mehdi Mohseni as inventors. Each reference mentioned in this patent document is herein incorporated by reference in its entirety.

BACKGROUND

A. Technical Field

The present disclosure relates generally to the identification of network topologies based not only on discrete channel estimation measurements but also network-level information such as load and inter-channel interference. In certain embodiments, a preferred topology is identified that results in improved network throughput because of a more dynamic analysis of these measurements.

B. Description of the Related Art

Home wireless networks are typically made up of a wide mix of devices: routers, access points (APs), consumer communication devices, IoT devices, video distribution boxes, etc. Traditionally, each wireless network contained a single AP, to which all wireless clients ("stations" or "STAs") connected. However, the limited range of a single AP often places undesirable requirements on its placement inside the home. And, even when these requirements are met, some parts of the home are often still left without strong wireless coverage, typically due to other issues like interference from other nearby APs (e.g., neighbors), or even severe attenuation from obstacles inside the house (e.g., rebar in walls).

Existing methods for coordinated management of such multi-hub networks leave much to be desired. They are typically simple extensions of the methods available for single APs, and do not take into account the competitive nature of the objectives of different APs and/or extenders (collectively referred to as "hubs"). For example, a station typically connects to the hub with the highest RSSI (Received Signal Strength Indicator). But that hub may already be overloaded with too many other clients, and it may not be able to provide a high throughput or even a stable connection to its new client. A different hub that is located further away but is only lightly loaded with clients may have been a better choice even though it has a lower RSSI, and yet existing systems typically do not even consider this possibility.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
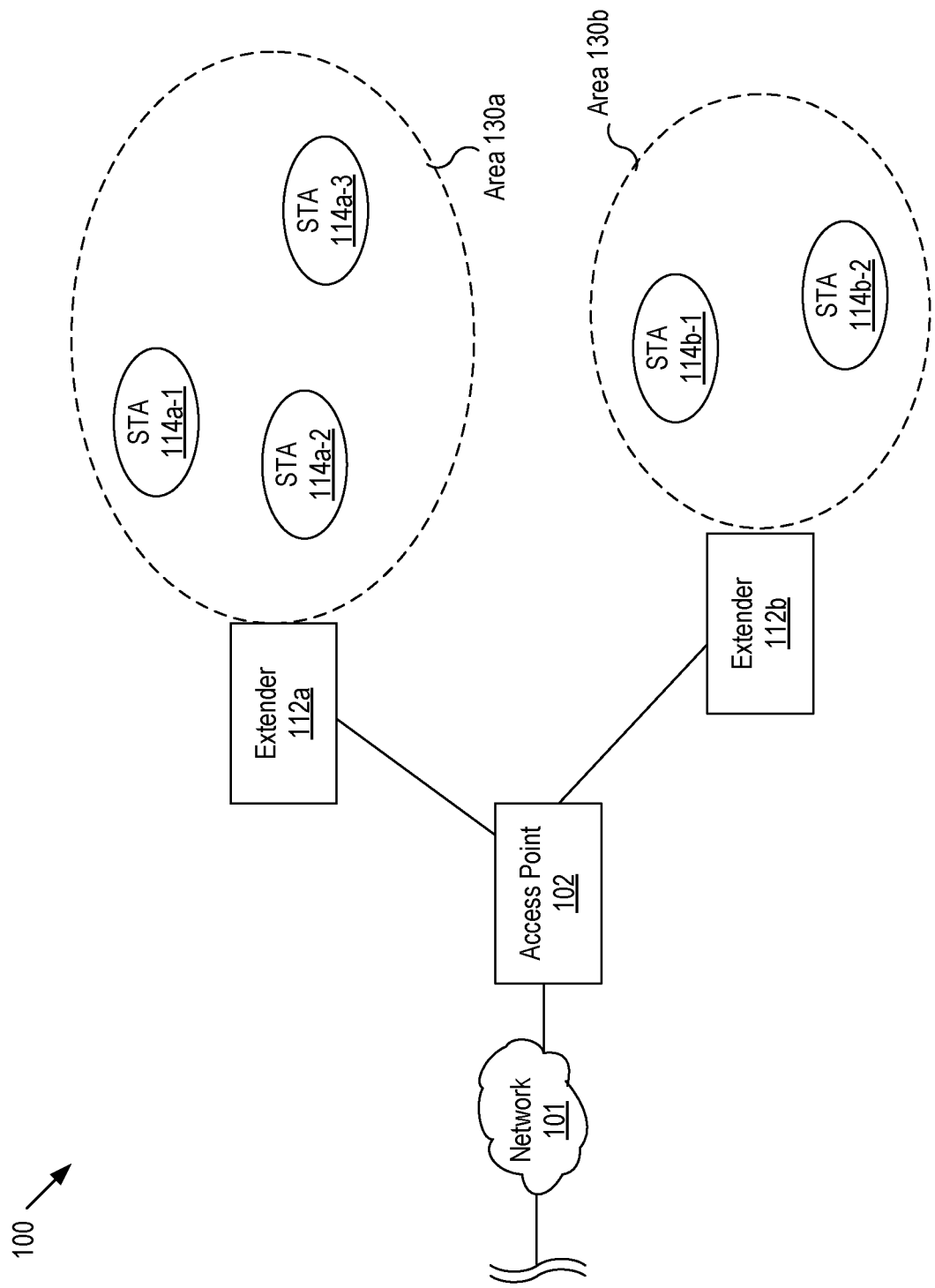
FIG. 1 ("FIG. 1") depicts a prior art star network topology for one or more local area networks.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. All documents cited herein are incorporated by reference herein in their entirety.

It shall also be noted that although embodiments described herein may be within the context of resource management of wireless communication systems, aspects of the present disclosure are not so limited. Accordingly, the aspects of the present disclosure may be applied or adapted for use in other contexts.

FIG. 1 depicts a star network topology deploying two extenders 112 connected to a wireless access point 102. In prior art systems, the deployed star topology is created based on discrete RSSI measurements between the access point 102 and each of the extenders 112a, 112b. This prior art configuration is oftentimes not an optimal deployment because the measurements (e.g., RSSI) fail to take into account the load on each of the extenders as well as how each connection may negatively affect other connections within the topology such as inter-channel interference and/or cross-talk caused by the wireless connections operating within a shared or overlapping frequency band(s).

Figure 2:
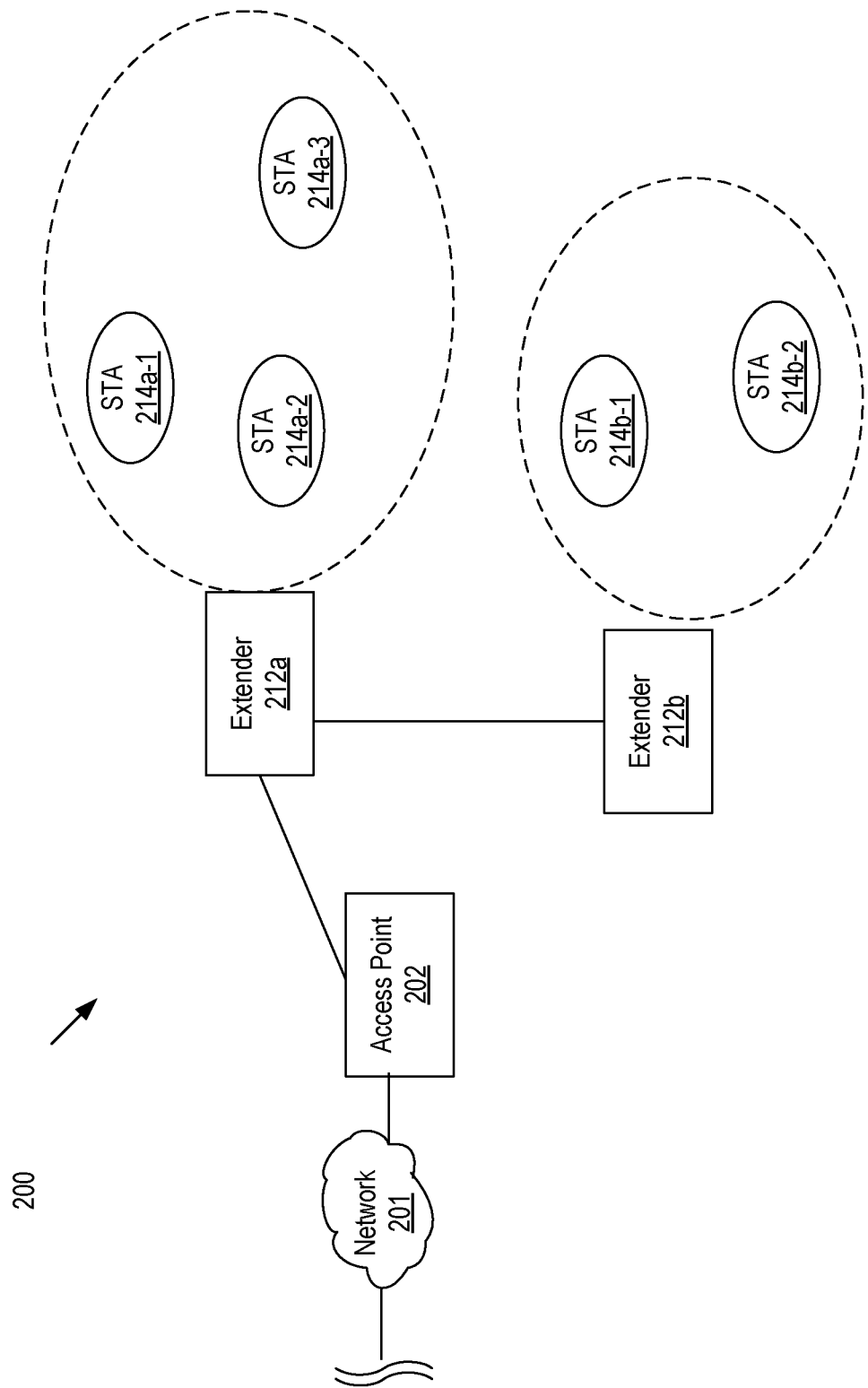
FIG. 2 depicts a prior art daisy-chained network topology for one or more local area networks.

FIG. 2 depicts a daisy-chained network topology once again based on discrete and independent measurements of connectivity between the extenders 212a, 212b and the access point 202. This particular daisy-chained topology may not be optimized because of the deficiencies within prior art procedures in defining optimal network topologies.

In embodiments, the stations 114a-1-114a-3, 114b-1-114b-2, 214a-1-214a-3, 214b-1-214b-2 may be user devices and include a wide variety of applications, ranging from tasks that require low speed with low latency and very high reliability (e.g., remote lighting solutions) to tasks that demand continuous high-speed connectivity with high reliability, but where low latency (in the millisecond range) is not that important (e.g., constantly-streaming high-definition security cameras). In embodiments, these new applications may communicate the network via the AP and extender(s). For instance, the station 114a-1 may communicate data to the network 101 through one extender 112a and one AP 102, i.e., the data flows 114a-1→112a→102→101 or vice versa. In another example, the station 214b-1 may communicate data to the network 201 through the two extenders and one AP: 214b-1→212b→212a→202→201 or vice versa. In the system 100, each of the extenders 112a and 112b may be directly coupled to the AP 102 to form a star topology. In the system 200, the extenders 212a and 212b may be communicatively coupled to the AP 202 in a daisy chain topology, i.e., the extender 212b may communicate data with the AP 202 via the extender 212a.

In embodiments, the components in the system 100 (or 200) may communicate with each other through a wireless communication channel. In the system 100, each extender ("hub") may connect directly to an AP and extend the communication range to problematic areas. For instance, the extender 112a in the system 100 may provide wireless communications for the STAs 114a-2-114a-3 that may be located in the area 130a, where the AP 102 may not be able to communicate directly with the devices in the area 130a. Similarly, the extender 112b may cover the area 103b, where the AP 102 is not able to directly communicate data with the devices in the area 103b.

In embodiments, each of the AP 102 (202) and/or extenders 112a-112b (212a-212b) has its own radio(s), its own connectivity rules, and its own performance objectives. In conventional systems, the connections between the APs and extenders are configured without taking into account these characteristics of the AP and extenders. As such, in conventional systems, different hubs often end up with competing objectives, with unwanted results such as multiple devices vying for the same frequency channels, or a net reduction of usable spectrum available to stations due to the need for hubs to communicate wirelessly with each other.

The following example illustrates methods in which throughput is measured instead of a discrete RSSI measurement in defining a network topology for the one access point and two extenders that share a single band or have overlapping bands.

Example 1: One AP and Two Extenders that Share One Frequency Band

In embodiments, a system that includes one AP and two extenders, three possible topologies may be possible:
1. Both extenders are connected directly to the AP, as depicted in FIG. 1
2. The first extender, E1, is connected to the AP, and the second extender, E2, is connected to E1 (daisy chain), as depicted in FIG. 2; and
3. E2 is connected to the AP, and E1 is connected to E2 (similar to FIG. 2, with E1 and E2 roles reversed).

In embodiments, one of the three topologies that maximizes the minimum of connection received-signal-strength-indicator (RSSI) values in the resulting network may be selected, i.e., the topology that defines the selected cost function of this optimization approach as max{min(RSSI)}. In this method, the solution may be described as follows: If both E1 and E2 measure a higher RSSI from the AP than from the other extender (E2 or E1, respectively), they connect directly to the AP, resulting in the star topology, as shown in FIG. 1. But if at least one of the extenders E1 and E2 measures a higher RSSI from the other extender compared to the RSSI measured from the AP, then that extender will want to connect to the other extender, which in turn will connect to the AP 202. If both extenders want to connect to each other, that would not result in a viable topology, because there would be no connection to the AP 202; therefore, the extender with the higher RSSI to the AP 202 will be forced to connect to the AP 202, in order to create a viable topology. In either case, the resulting topology will be a daisy chain, as shown in FIG. 2: the extender (e.g. 212a) that measures either (i) a higher RSSI from the AP 202 than from the other extender 212b or (ii) the higher RSSI from the AP 202 among the two extenders, will connect to the AP 202, and the other extender 212b will connect to the extender 212a that connects to the AP 202. In embodiments, instead of RSSI, the direct throughput measurements between the extenders may be used instead of the RSSI to improve this method.

In the method described above, the cost function of maximizing the minimum RSSI value between hubs may be practical and easy to optimize. This method does not consider the fact that, if the path between the AP and one of the extenders (say E2) is a multi-hop (daisy chain topology, i.e., AP<-->E1<-->E2), and if both connections operate in the same frequency band (for example, because of heavy interference in the other bands), the end-to-end throughput between the AP and E2 may be T1A*T21/(T1A+T21), where T1A and T21 are the throughput values for connections from E1 to the AP and from E2 to E1, respectively). In this case, it may be better to directly connect E2 to AP than to E1 (star topology, i.e., E1<-->AP<-->E2), even if E2 measures a higher RSSI from E1 than from the AP. If the throughput of E2 to AP is T2A, and T2A is only a little lower than T1A, then the resulting throughput will be min(T1A, T2A)=T2A, which is higher than T1A*T21/(T1A+T21), even if T2A is lower than T21. For example, if T1A=100, T21=100, and T2A=80, then the daisy-chain topology in FIG. 2 results in a throughput of 50, while the star topology in FIG. 1 results in a throughput of 80.

As such, in the case where the connections between AP<-->E1 and E1<-->E2 use the same frequency band, the direct throughput measurements between the extenders may be used instead of RSSI, to thereby modify the method for selecting a topology. In other words, max{min(Tput)}, where Tput is the throughput from the AP to each extender, is a better cost function than max{min(RSSI)}, because it maximizes the minimum throughput from the AP to the extenders.

Figure 3:
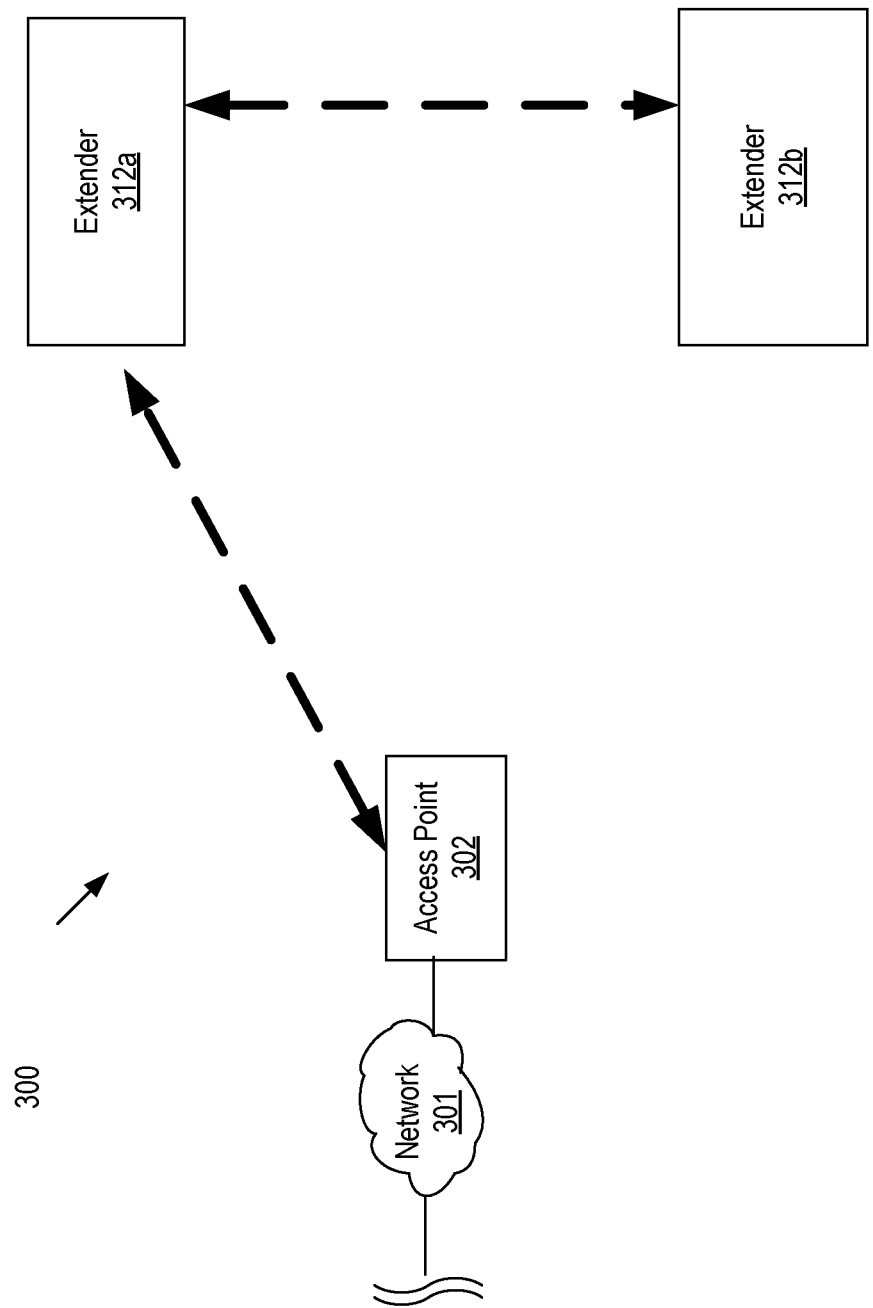
FIG. 3 depicts a first daisy-chained network topology for one or more local area networks according to various embodiments of the invention.

FIG. 3 depicts a first daisy-chained topology in which an access point 302 is coupled to a first extender 312a, which is coupled to a second extender 312b. When compared to the method of defining a topology in FIGS. 1 and 2 which only use RSSI measurements, the topologies in FIGS. 3-5 result from a more dynamic modeling of the network where other factors are also considered, including load and inter-channel interference. The channel responses between the access point 302 and the extenders 312 are measured. In addition, measurements taken across the network, such that inter-channel interference and network load, are also included in defining a preferred network configuration. In addition, band allocation may be adjusted across these connections to further increase throughput as a result of further improvements of inter-channel interference.

Figure 4:
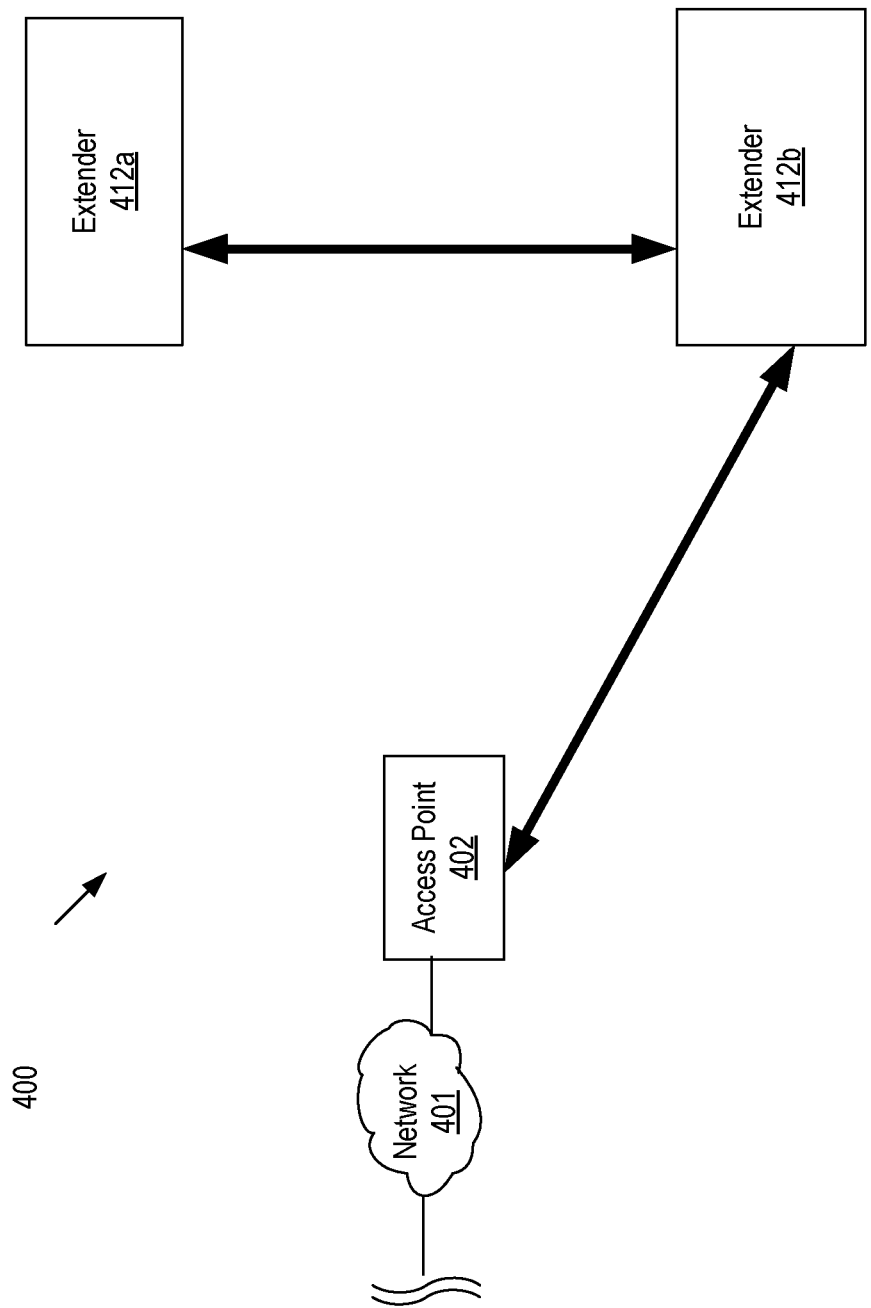
FIG. 4 depicts a second daisy-chained network topology for one or more local area networks according to various embodiments of the invention.

FIG. 4 depicts a second daisy-chained topology in which an access point 402 is coupled to a second extender 412b, which is coupled to the first extender 412a. As discussed in FIG. 3, measurements are taken that not only account for discrete channel response measurements but also inter-channel interference and load are measured across the entire network. This resulting topology may also allocate different bands between the extenders and the access point to further increase overall throughput.

Figure 5:
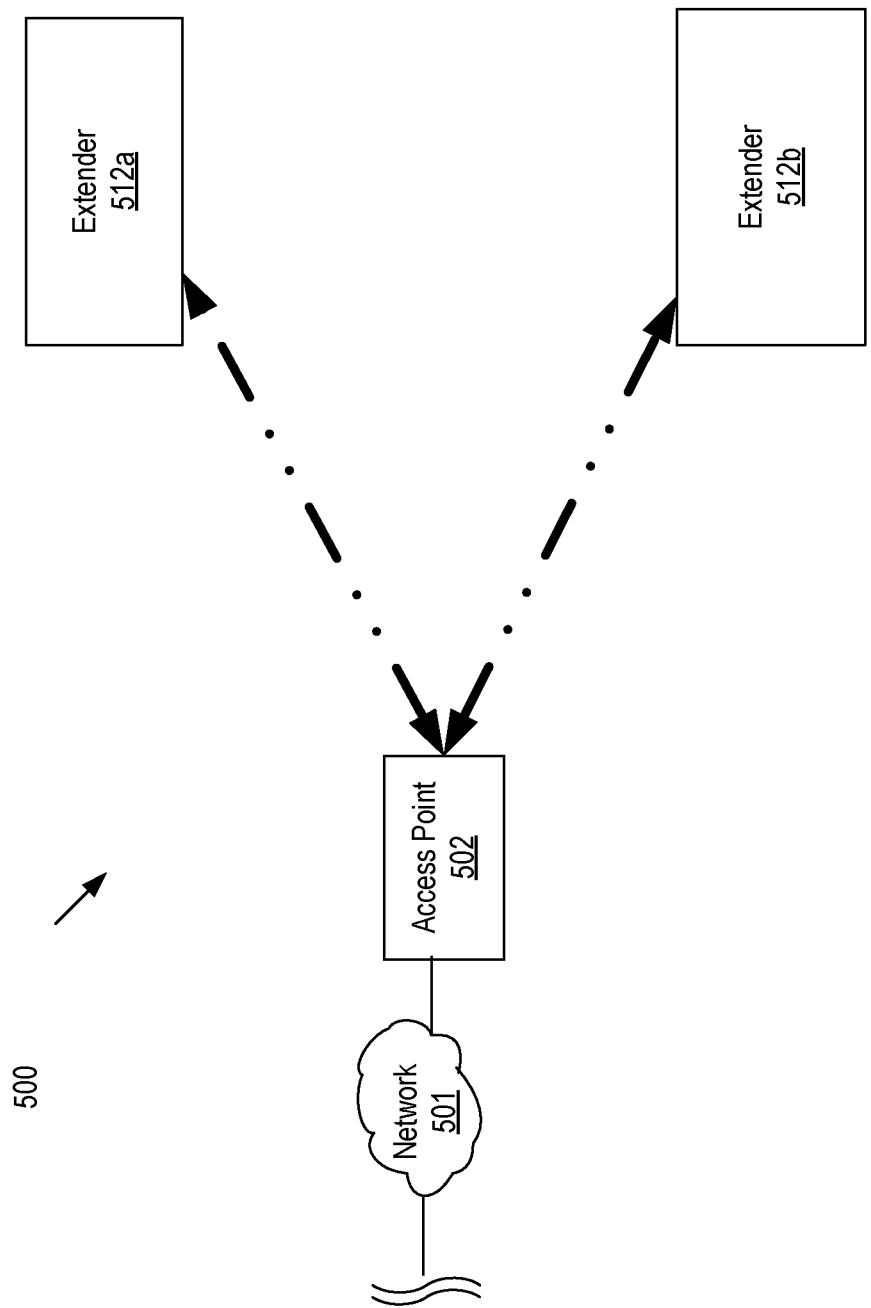
FIG. 5 depicts a star topology for one or more local area networks according to various embodiments of the invention.

FIG. 5 depicts a star topology in which an access point 502 is coupled directly to a first extender 512a and second extender 512b. This topology may be identified as a result of channel measurements, network inter-channel interference and load. The result of this more dynamic modeling of network performance provides a more accurate depiction of the network and identifies a preferred topology that improves overall throughput. Exemplary network scenarios and corresponding channel measurements, inter-channel infringement and load are described later in this application to highlight the improved overall throughput of the network when a more dynamic model is used in deployment of network topologies.

Figure 6:
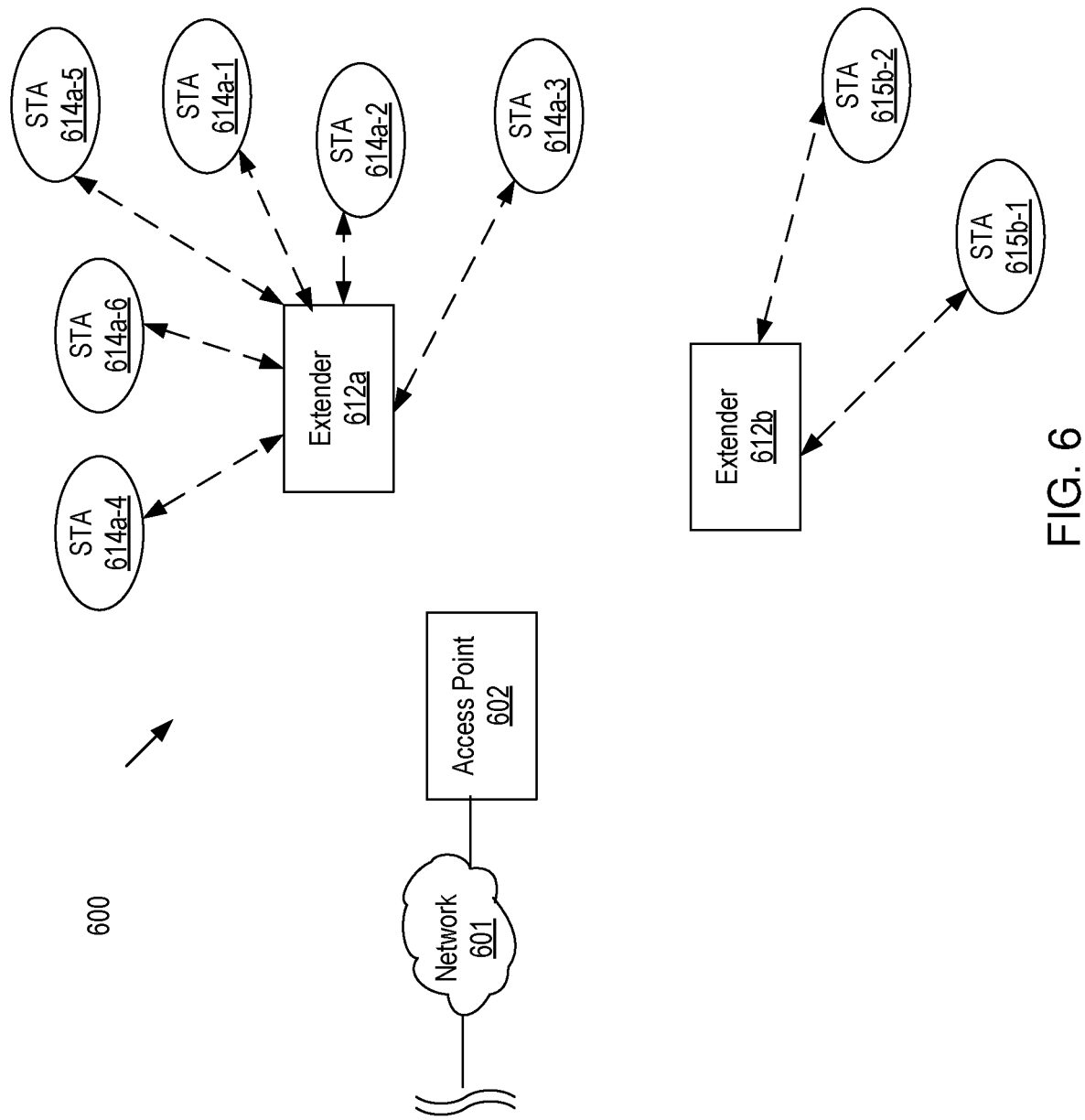
FIG. 6 depicts a plurality of extenders associated with an access point in which the load on each extender varies according to various embodiments of the invention.

FIG. 6 illustrates a possible scenario in which load across a first extender 612a and a second extender 612b is asymmetric. In this example, the load across the two extenders is highly disproportionate which will result in traffic to/from the first extender being significantly larger than the traffic to/from the second extender. This asymmetric traffic may result in heavy cross-talk between channels if they are shared between components. Additionally, the unequal load may be disproportionately balanced if a selected network topology does not take this into account.

Figure 7:
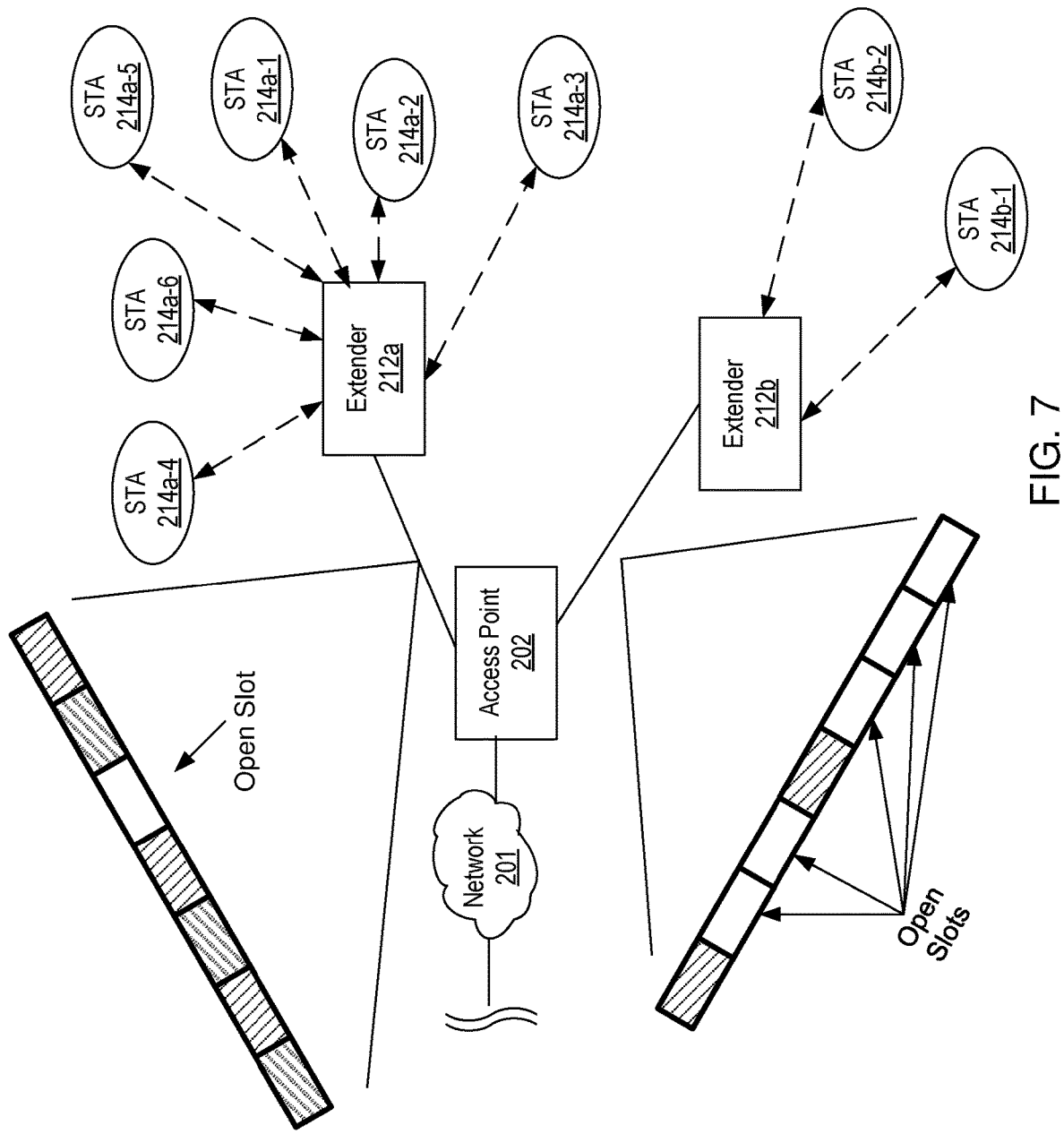
FIG. 7 illustrates traffic load between extenders and access point according to various embodiments of the invention.

FIG. 7 illustrates the effect of asymmetric load and inter-channel interference across channels within a network. As shown, the channel between the first extender 712a and access point 702 is significantly more congested than the channel between the second extender 712b and the access point 702. As shown, the traffic stream from the first extender 712a contains only a single unused window for transmission of traffic while the traffic stream from the second extender 712b contains many unused windows. This unbalanced traffic load may not only bog down a single node within a network topology but may also result in significant inter-channel interference. Accordingly, various procedures are described below in which this type of information is analyzed to define a particular topology and frequency band allocation to enhance overall network throughput.

Example 2: One AP and Two Extenders and Two Frequency Bands

Systems 300, 400, 500 may use two frequency bands for communication. For instance, the system may operate under the following conditions:
1. E1 can connect to the AP in the 5G band, with high throughput T1A, e.g., T1A=500.
2. E2 is located further away and can connect to the AP in the 2G band with throughput T2A=50 and to E1 in the 5G band with throughput T21=200.

Under these conditions, the daisy-chain topologies in FIGS. 3 and 4 may result in a throughput from E2 to AP of 143 (since E1 connects to both the AP and E2 in the 5G band), while the star topology in FIG. 5 may result in a throughput of only 50. As such, a topology with higher throughput than the star topology in FIG. 5 may be selected for communication.

In embodiments, the total load on E1 may be also considered to select the topology. If E1 has many devices already connected to it, the airtime of E1 that is available for E2 may be low, let's say 20%. Therefore, the effective throughput from E2 to AP in the daisy-chain topology in FIGS. 3 and 4 may end up being only 29 (20% of 143), which is again lower than the throughput achieved with the star configuration.

In other words, in embodiments, the cost function may need to be modified to incorporate the load of individual extenders in addition to the nominal throughput in the determination of the optimal topology. In embodiments, such an approach may be achieved by considering the load on each extender in the computation of the corresponding effective throughput. This approach may modify the cost function indirectly, by modifying the throughput function that is used in the cost function.

Example 3: One AP and Two Frequency Bands

A communication system may include a single AP and support wireless links to multiple stations, in two frequency bands, such as the 2G and the 5G bands, and use band steering. Band steering is the process by which an AP encourages a station to connect using a particular band (in this case 2G or 5G) in order to improve overall performance.

In embodiments, one method for band steering is to minimize interference, which is defined as the number of timeslots that are already occupied in a particular band. In one example, the AP may see that the interference in the 2G band is at 70% (for instance, because several devices are already connected that are only capable of operating in the 2G band), while in the 5G band the interference is only 30%. In such a case, the AP may instruct a dual-band station (i.e., one capable of operating in both the 2G and 5G bands) that is connected in the 2G band to switch to the 5G band.

However, the station in question may, in fact, be unable to connect to the AP in the 5G band under the particular conditions it is experiencing. For example, the station may be located just outside the range of the 5G band of the AP. Or the station may be experiencing heavy interference in the 5G band from a neighbor's 5G AP, which is located just far enough away to be invisible to the station's own AP (and therefore not be correctly accounted for in the interference calculations). In such a case, if the AP instructs the station to connect in the 5G band, the station may drop its connection, which is a highly undesirable result.

In embodiments, the interference minimization cost function may be modified by adding the constraint that connection drops may be kept below an acceptable threshold. Then, the AP may keep a history of past connection drops for each station and disable band steering for stations that are in danger of dropping their connections to the AP.

Example 4: One AP and Two Channels

The communication system may include one AP that communicates with multiple stations through two channels. For the purpose of illustration, it is assumed that the AP is connected to multiple stations in the 5G band, for instance.

Figure 8:
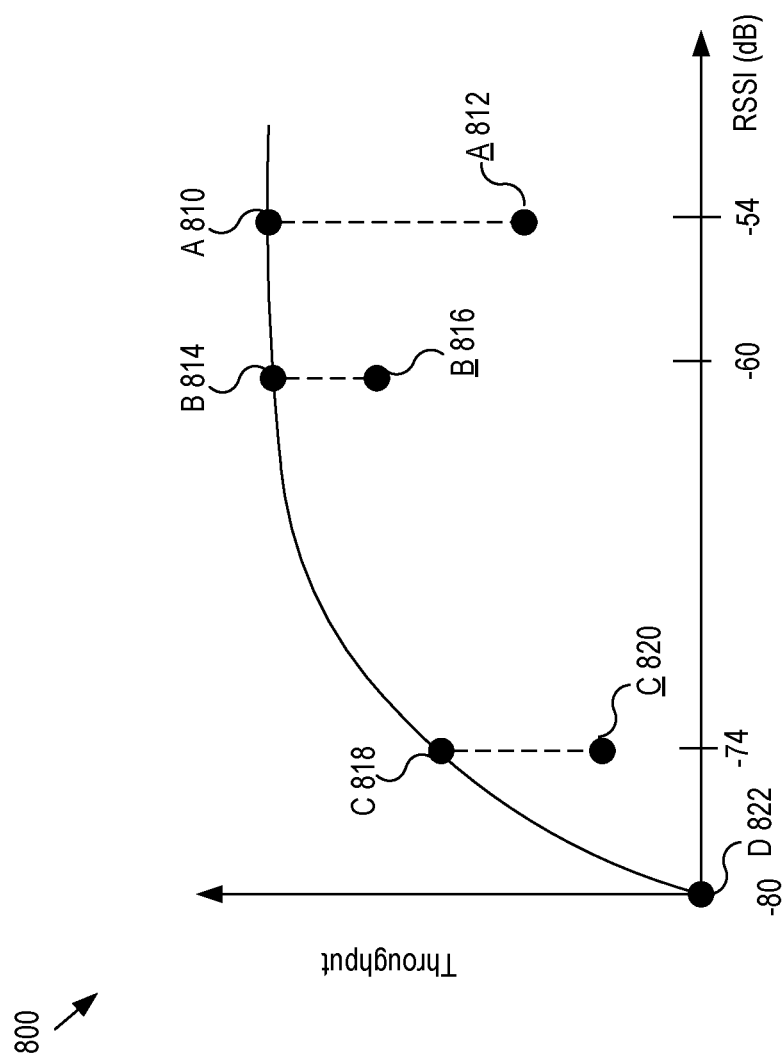
FIG. 8 depicts a plot of throughput as a function of RSSI according to embodiments of the present disclosure.

Station STA may be located fairly close to the AP and therefore has a high RSSI. FIG. 8 shows a plot 800 of throughput as a function of RSSI. As shown in FIG. 8, station STA may be located at a point where it is using channel 149. On channel 149, the AP transmission power is 23 dBm and the RSSI is −54 dBm, but the interference is high (e.g., 60%). The point A 810 in the plot 800 represents the (hypothetical) channel condition where the station STA has no interference and uses channel 149. But when the interference is taken into account, station STA is actually represented by point A 812, so its actual throughput is significantly lower. If the AP decides to reassign station STA to channel 36, station STA may move to a point B 816, where the interference of the channel is low (e.g., 20%). The transmit power of the AP on channel 36 is 6 dB lower at 17 dBm, but the RSSI is still very high at −60 dBm, and the significantly lower interference means that the throughput of station STA may approximately double by moving from channel 149 to channel 36. In the plot 800, the point B 814 represents the (hypothetical) channel condition where the station STA uses channel 36 and has no interference.

Station STA may be located further away from the AP. It is assumed that station STA is using channel 149 and the point C 820 corresponds to the channel condition of station STA where the interference is still 60%. As depicted, the RSSI is significantly lower at −74 dBm, and so is its throughput, compared to the condition at the point A 812. In the plot 800, the point C 818 represents the (hypothetical) channel condition where station STA uses channel 149 and does not have any interference. If the AP re-assigns station STA to channel 36, the channel condition moves from the point C 820 to the point D 822. By changing the channel, the interference is reduced to 20%, but the lower AP transmit power (by 6 dB) may push the RSSI of station STA to a low enough level (−80 dBm) that station STA may lose connectivity and its throughput may go down to zero.

In embodiments, the cost function of minimizing the interference, i.e., min(interference), may result in an undesirable disconnect event. Therefore, in embodiments of the present invention, the cost function may be augmented by taking into account the uplink RSSI (to determine whether the station is in a high RSSI or low RSSI location) and the AP transmit power (which acts as a proxy for the downlink RSSI).

As illustrated by the examples described above, in embodiments, generalizing existing cost functions that involve metrics, such as RSSI or interference, by adding constraints on additional metrics, such as dropped connections, load, transmit power, and throughput, may result in significant improvements in the performance of wireless networks.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 9:
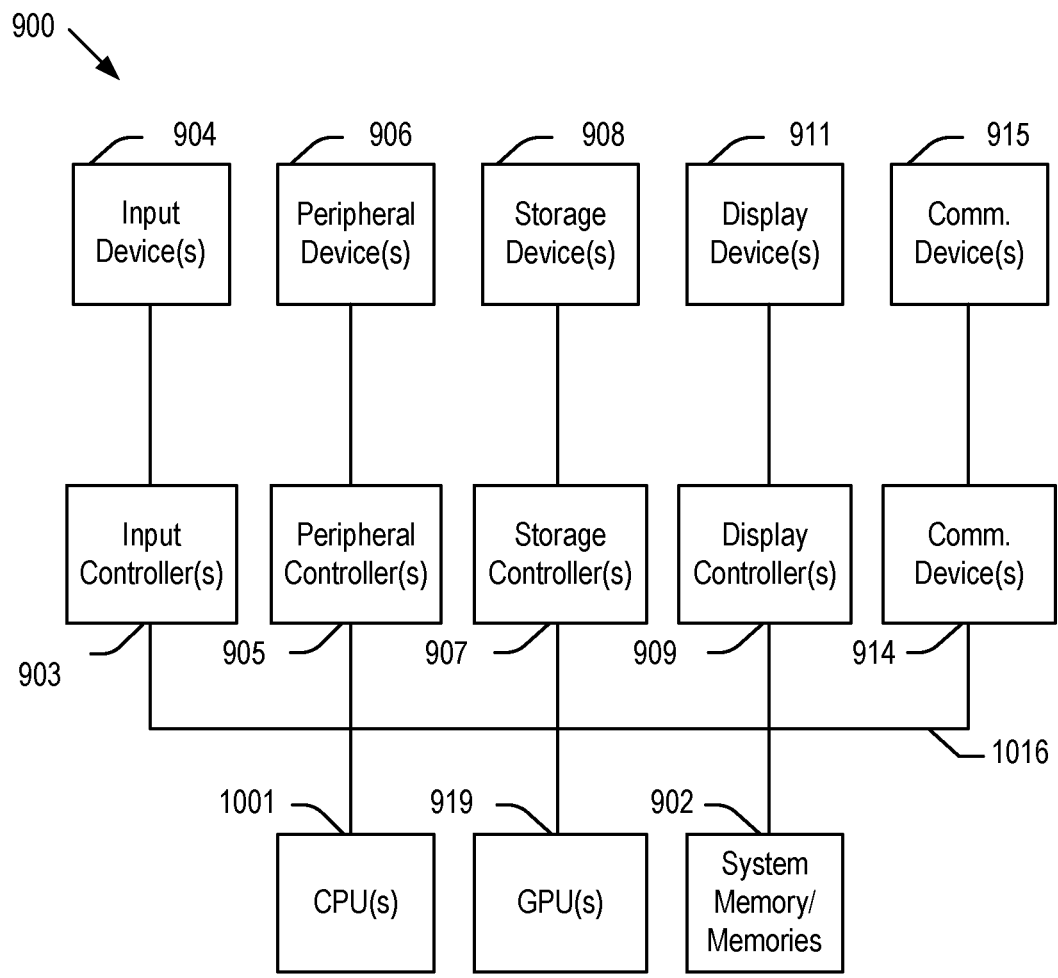
FIG. 9 is a block diagram of an information handling system (or computing system) according to embodiments of the present disclosure.

FIG. 9 depicts a block diagram of an information handling system (or computing system) according to embodiments of the present disclosure. It will be understood that the functionalities shown for system 900 may operate to support various embodiments of a computing system—although it shall be understood that a computing system may be differently configured and include different components, including having fewer or more components as depicted in FIG. 6.

As illustrated in FIG. 9, the computing system 900 includes one or more central processing units (CPU) 901 that provides computing resources and controls the computer. CPU 901 may be implemented with a microprocessor or the like, and may also include one or more graphics processing units (GPU) 919 and/or a floating-point coprocessor for mathematical computations. System 600 may also include a system memory 902, which may be in the form of random-access memory (RAM), read-only memory (ROM), or both.

A number of controllers and peripheral devices may also be provided, as shown in FIG. 6. An input controller 903 represents an interface to various input device(s) 904, such as a keyboard, mouse, touchscreen, and/or stylus. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT), a thin film transistor (TFT) display, organic light-emitting diode, electroluminescent panel, plasma panel, or other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 916, which may represent any number of physical buses. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A system for improving wireless network performance, the system comprising:
   an access point coupled to a backend network, the access point having a plurality of wireless interfaces on which a plurality of extenders that couple to stations communicate;
   a first extender within the plurality of extenders, the first extender coupled to at least one of a first plurality of terminals, the first extender communicates with a first wireless interface in the plurality of wireless interfaces on the access point;
   a second extender within the plurality of extenders, the second extender coupled to at least one of a second plurality of terminals, the second extender communicates with a second wireless interface in the plurality of wireless interfaces on the access point; and
   a processor coupled to communicate with the access point, the first extender and the second extender, the processing unit receives a plurality of measurements related to throughput across a plurality of possible connection architectures between the access point, the first extender, and the second extender, the processor uses plurality of measurements to modify a throughput function that modifies a cost function to determine a preferred connection architecture, the cost function comprising a constraint on dropped connections between a station and the access point.

2. The system according to claim 1 wherein the preferred connection architecture is determined based at least on (1) a plurality of RSSI power measurements across the plurality of possible connection architectures, (2) a plurality of interference measurements across the plurality of possible connection architectures, (3) a first load measurement associated with the first plurality of terminals and (4) a second load measurement associated with the second plurality of terminals.

3. The system according to claim 1 wherein the constraint comprises a requirement that dropped connections remain kept below an predetermined threshold.

4. The system according to claim 1 wherein the first extender has a first plurality of connectivity rules and a first set of performance objectives and the second extender has a second plurality of connectivity rules and a second set of performance objectives.

5. The system of claim 4 wherein the first and second set of plurality of connectivity rules and the first and second set of performance objectives are provided to the processor and used at least in part to determine the preferred connection architecture.

6. The system according to claim 1 wherein the access point measures interference across a frequency range, the interference measurement being provided to the processor and used at least in part to identify the preferred connection architecture.

7. The system according to claim 1 wherein the processor receives band allocation information across a plurality of potential connections between the access point, the first extender and the second extender, the received band allocation information being used at least in part to determine the preferred connection architecture.

8. The system according to claim 7 wherein overlapping frequency transmission bands are identified between a first connection between the first extender and the access point and a second connection between the first extender and the second extender, the overlapping frequency transmission bands being used at least in part to determine the preferred connection architecture.

9. The system according to claim 8 wherein the processor manages time slots between the first connection and the second connection to reduce interference.

10. The system according to claim 1 wherein the processor analyzes both symmetric and asymmetric load interference for a plurality of potential connection topologies between the access point, the first extender, and the second extender, the analyzed symmetric and asymmetric load interference are used at least in part to identify the preferred connection architecture.

11. The system according to claim 1 wherein at least one of the possible connection architectures comprises a connection topology and a frequency band allocation.

12. A processing unit for improving wireless network performance, the processing unit comprising:
    a first interface on which power measurements and a plurality of measurements related to throughput are received across a plurality of potential connection topologies within a network comprising an access point and a plurality of extenders; and
    a processor coupled to receive the power measurements and the plurality of measurements related to throughput, the processor uses the power measurements and the at least one measurement related to throughput to modify a throughput function that modifies a cost function to determine a preferred connection architecture, the cost function comprising a constraint on dropped connections between a station and the access point.

13. The processing unit of claim 12 wherein the at least one measurement related to throughput comprise a plurality of interference measurements across the plurality of potential connection topologies and a plurality of load measurements related to terminals within the network.

14. The processing unit of claim 12 wherein the potential connection topologies comprise a topology in which at least a first extender of the plurality of extenders is connected to the access point via a daisy-chain connection through a second extender of the plurality of extenders and a topology in which every extender in the plurality of extenders is connected via a point-to-point connection to the access point.

15. The processing unit of claim 12 wherein the preferred connection architecture is determined based at least in part on a band steering analysis of the potential connection topologies.

16. The processing unit of claim 12 wherein at least one of the possible connection architectures comprises a connection topology and a frequency band allocation.

17. The processing unit of claim 12 wherein the cost function comprises uplink Received Signal Strength Indicator (RSSI) as a metric.

18. The processing unit of claim 12 wherein the cost function accounts for an access point transmit power that is representative of a downlink RSSI.

19. A method of defining a preferred connection architecture comprising connections between an access point and a plurality of extenders that couple to stations, the method comprising:
    determining a first throughput of a first wireless channel between the access point and a first extender within the plurality of extenders, the first throughput based at least in part on a first received power measurement through the first wireless channel and a first interference measurement on the first wireless channel;

determining a second throughput of a second wireless channel between the access point and a second extender within the plurality of extenders, the second throughput based at least in part on a second received power measurement through the second wireless channel and a second interference measurement on the second wireless channel;

determining a third throughput of a third wireless channel between the first extender and the second extender, the third throughput based at least in part on a third received power measurement through the third wireless channel and a third interference measurement on the third wireless channel;

identifying a first load associated with the first extender and a second load associated with the second extender;

using the first and second loads, and at least two of the first, second, and third throughputs to modify a throughput function that modifies a cost function; and using the cost function, which comprises a constraint on dropped connections between a station and the access point, to determine a preferred connection architecture.

20. The method of claim 19 wherein the cost function accounts for disabling band steering for one or more stations that are at risk of dropping their connections to the access point.

21. The method of claim 19 wherein the preferred connection architecture comprises a connection topology and a frequency band allocation.

22. The method of claim 21 wherein the connection topology of the preferred connection architecture is selected from a group consisting of topologies in which at least a first extender of the plurality of extenders is connected to the access point via a daisy-chain connection through a second extender of the plurality of extenders and a topology in which every extender in the plurality of extenders is connected via a point-to-point connection to the access point.

* * * * *